US010395074B1

(12) United States Patent
Yang et al.

(10) Patent No.: US 10,395,074 B1
(45) Date of Patent: Aug. 27, 2019

(54) RFID READER AND ANTENNA STRUCTURE THEREOF

(71) Applicant: AUDEN TECHNO CORP., Taoyuan (TW)

(72) Inventors: Chang-Fa Yang, Taipei (TW); An-Yao Hsiao, Taoyuan (TW); Chen-Pang Chao, Taoyuan (TW); Cheng-Han Tsai, New Taipei (TW)

(73) Assignee: AUDEN TECHNO CORP., Taoyuan (TW)

( * ) Notice: Subject to any disclaimer, the term of this patent is extended or adjusted under 35 U.S.C. 154(b) by 0 days.

(21) Appl. No.: 16/147,445

(22) Filed: Sep. 28, 2018

(51) Int. Cl.
| G06K 7/10 | (2006.01) |
| G06K 19/077 | (2006.01) |
| H01Q 1/22 | (2006.01) |
| H01Q 1/38 | (2006.01) |

(52) U.S. Cl.
CPC ... G06K 7/10356 (2013.01); G06K 19/07749 (2013.01); H01Q 1/2216 (2013.01); H01Q 1/38 (2013.01)

(58) Field of Classification Search
CPC ......... G06K 7/10356; G06K 19/07749; H01Q 1/2216; H01Q 21/28; H01Q 1/243
USPC ...................................................... 340/572.7
See application file for complete search history.

(56) References Cited

U.S. PATENT DOCUMENTS

| 5,594,448 A * | 1/1997 | d'Hont ..................... H01Q 7/00 340/935 |
| 7,019,651 B2 * | 3/2006 | Hall ................... G06K 7/10336 340/572.7 |
| 7,336,243 B2 * | 2/2008 | Jo ....................... G06K 19/0726 340/572.7 |
| 7,505,000 B2 * | 3/2009 | Hockey ............ G06K 19/07749 343/700 MS |
| 7,733,290 B2 * | 6/2010 | Schneider ............ H01Q 1/2216 343/842 |
| 7,804,411 B2 * | 9/2010 | Copeland ........... G06K 19/0726 340/572.7 |
| 2002/0109636 A1 * | 8/2002 | Johnson ................... H01Q 1/22 343/742 |

\* cited by examiner

*Primary Examiner* — John A Tweel, Jr.
(74) *Attorney, Agent, or Firm* — Li & Cai Intellectual Property (USA) Office

(57) ABSTRACT

An antenna structure of an RFID reader includes a carrying plate defining four quadrants and an antenna module disposed on the carrying plate. The antenna module includes a feeding antenna and a grounding antenna. The feeding antenna includes a feeding connecting segment, two feeding transmitting segments connected to the feeding connecting segment, and two feeding radiating segments respectively connected to the two feeding transmitting segments. The grounding antenna includes a grounding connecting segment, two grounding transmitting segments connected to the grounding connecting segment, and two grounding radiating segments respectively connected to the two grounding transmitting segments. The feeding connecting segment and the grounding connecting segment are arranged on an intersection point of the four quadrants, the two feeding transmitting segments respectively correspond in position to the two grounding transmitting segments, and the two feeding radiating segments and the grounding radiating segments are respectively arranged in the four quadrants.

10 Claims, 7 Drawing Sheets

RFID READER AND ANTENNA STRUCTURE THEREOF

FIELD OF THE DISCLOSURE

The present disclosure relates to a reader, and more particularly to a radio-frequency identification (RFID) reader and an antenna structure thereof.

BACKGROUND OF THE DISCLOSURE

A conventional reader can obtain information stored in different information carriers (e.g., game tokens), and an antenna structure of the conventional reader will affect the accuracy of the information carrier that can be read. However, since an electromagnetic field generated from each segment of the antenna structure of the conventional reader just affect an area around the corresponding segment, the near field reading performance of the conventional reader is difficult to be improved.

SUMMARY OF THE DISCLOSURE

In response to the above-referenced technical inadequacies, the present disclosure provides an RFID reader and an antenna structure thereof to effectively improve the issues associated with conventional antenna structures.

In one aspect, the present disclosure provides a radio-frequency identification (RFID) reader, which includes a carrying plate, an antenna module, and a transmitting cable. The carrying plate has a connecting portion and defines a first boundary and a second boundary both orthogonal to each other at the connecting portion. The carrying plate is defined as four quadrants by the first boundary and the second boundary, and the four quadrants are named as a first quadrant, a second quadrant, a third quadrant, and a fourth quadrant in sequence along a counterclockwise direction. The antenna module is disposed on the carrying plate, and includes a feeding antenna and a grounding antenna. The feeding antenna includes a feeding connecting segment, two feeding transmitting segments, and two feeding radiating segments. The feeding connecting segment is disposed on the connecting portion. The two feeding transmitting segments extend from the feeding connecting segment along two opposite directions that are substantially parallel to the first boundary. The two feeding radiating segments respectively and curvedly extend from the two feeding transmitting segments toward the second boundary. The two feeding radiating segments are respectively connected to ends of the two feeding transmitting segments arranged away from the connecting portion, and are respectively disposed in the first quadrant and the third quadrant. The grounding antenna includes a grounding connecting segment, two grounding transmitting segments, and two grounding radiating segments. The grounding connecting segment is disposed on the connecting portion. The two grounding transmitting segments extend from the grounding connecting segment along two opposite directions that are substantially parallel to the first boundary. The two grounding radiating segments respectively and curvedly extend from the two grounding transmitting segments toward the second boundary. The two grounding radiating segments are respectively connected to ends of the two grounding transmitting segments arranged away from the connecting portion, and are respectively disposed in the second quadrant and the fourth quadrant. The transmitting cable includes a feeding wire and a grounding wire. The feeding wire is connected to the feeding connecting segment, and the grounding wire is connected to the grounding connecting segment. When a first current related to the feeding wire travels in the two feeding radiating segments, and a second current related to the grounding wire travels in the two grounding radiating segments, the two feeding radiating segments and the two grounding radiating segments each generate a first magnetic direction, and are arranged in an annular shape to co-generate a second magnetic direction. The first magnetic directions and the second magnetic direction face the same side of the carrying plate.

In one aspect, the present disclosure provides an antenna structure of an RFID reader, which includes a carrying plate and an antenna module. The carrying plate has a connecting portion and defines a first boundary and a second boundary both orthogonal to each other at the connecting portion. The carrying plate is defined as four quadrants by the first boundary and the second boundary, and the four quadrants are named as a first quadrant, a second quadrant, a third quadrant, and a fourth quadrant in sequence along a counterclockwise direction. The antenna module is disposed on the carrying plate, and includes a feeding antenna and a grounding antenna. The feeding antenna includes a feeding connecting, two feeding transmitting segments, and two feeding radiating segments. The feeding connecting segment is disposed on the connecting portion. The two feeding transmitting segments extend from the feeding connecting segment along two opposite directions that are substantially parallel to the first boundary. The two feeding radiating segments respectively and curvedly extend from the two feeding transmitting segments toward the second boundary. The two feeding radiating segments are respectively connected to ends of the two feeding transmitting segments arranged away from the connecting portion, and are respectively disposed in the first quadrant and the third quadrant. The grounding antenna includes a grounding connecting segment, two grounding transmitting segments, and two grounding radiating segments. The grounding connecting segment is disposed on the connecting portion. The two grounding transmitting segments extend from the grounding connecting segment along two opposite directions that are substantially parallel to the first boundary. The two grounding radiating segments respectively and curvedly extend from the two grounding transmitting segments toward the second boundary. The two grounding radiating segments are respectively connected to ends of the two grounding transmitting segments arranged away from the connecting portion, and are respectively disposed in the second quadrant and the fourth quadrant.

Therefore, the RFID reader of the present disclosure can have a better near field reading performance by the antenna structure thereof. The two feeding radiating segments and the two grounding radiating segments of the antenna structure each can generate a first magnetic direction, and are arranged in an annular shape to co-generate a second magnetic direction, in which the first magnetic directions and the second magnetic direction face the same side of the carrying plate.

Specifically, the RFID reader of the present disclosure is provided with the two feeding radiating segments and the two grounding radiating segments for jointly generating the second magnetic direction to enhance a region that cannot be covered by the first magnetic directions, so that the near field reading performance of the RFID reader can be improved. Moreover, the RFID reader can generate a plurality of magnetic fields each having a magnetic direction perpendicular to the carrying plate, so that the RFID reader have a better near field reading performance for information carriers disposed on the carrying plate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
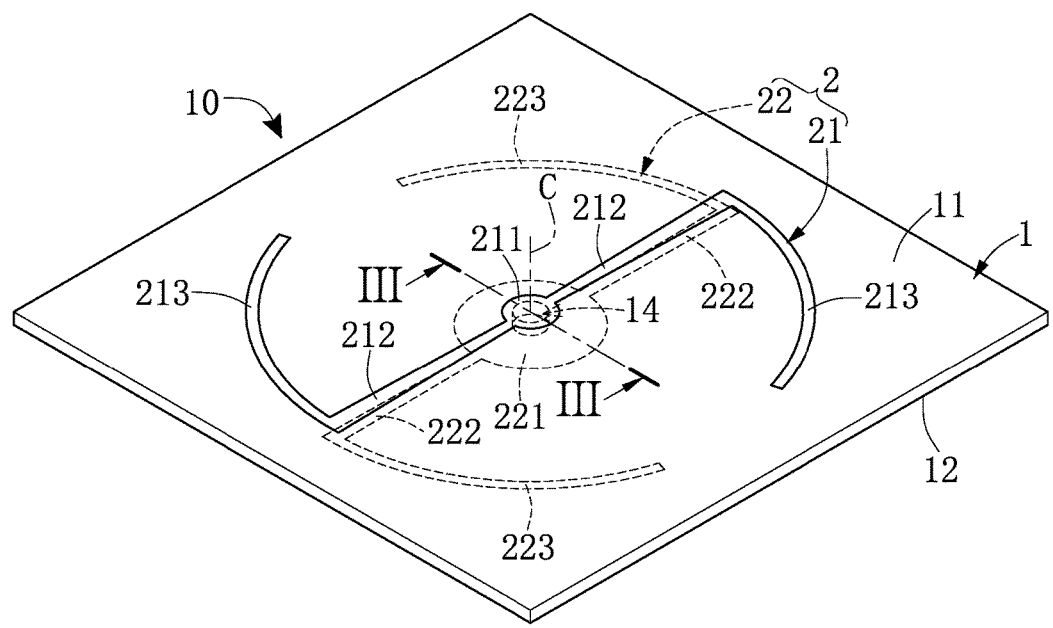
FIG. 1 is a perspective view of an RFID reader according to a first embodiment of the present disclosure as omitting a transmitting cable.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
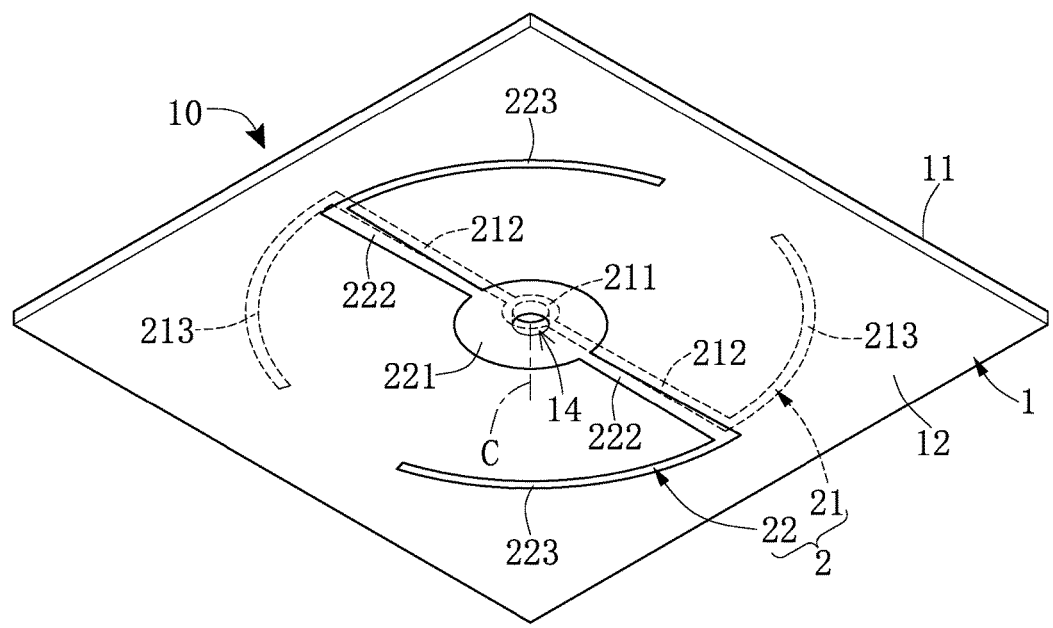
FIG. 2 is a perspective view of the RFID reader from another perspective of FIG. 1.
Figure 3:
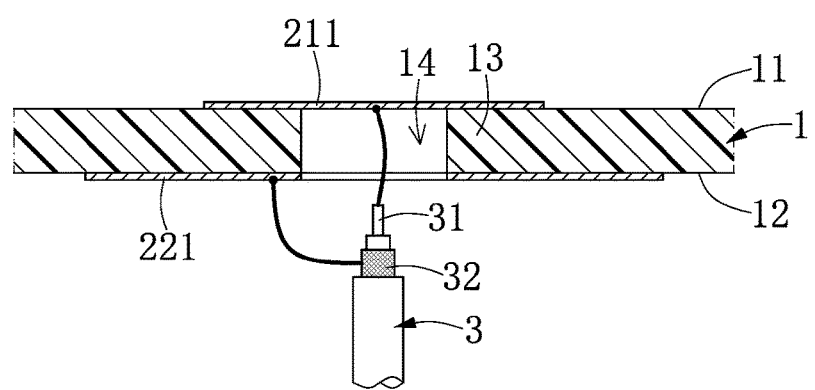
FIG. 3 is a cross-sectional view taken along a cross-sectional line IQ-IQ of FIG. 1.

Referring to FIG. 1 to FIG. 5, a first embodiment of the present disclosure provides an RFID reader capable of simultaneously reading information (or data) stored or recorded in different information carriers (e.g., game tokens). As shown in FIG. 1 to FIG. 3, the RFID reader of the present embodiment includes a carrying plate 1, an antenna module 2 disposed on the carrying plate 1, and a transmitting cable 3 electrically connected to the antenna module 2. The following description discloses the structure and connection relationships of each component of the RFID reader.

It should be noted that the carrying plate 1 and the antenna module 2 of the present embodiment can be co-defined as an antenna structure 10, and the antenna structure 10 of the present embodiment is cooperated with the transmitting cable 3, but the present disclosure is not limited thereto. For example, in other embodiments of the present disclosure, the antenna structure 10 can be independently sold or cooperated with other components.

Figure 4:
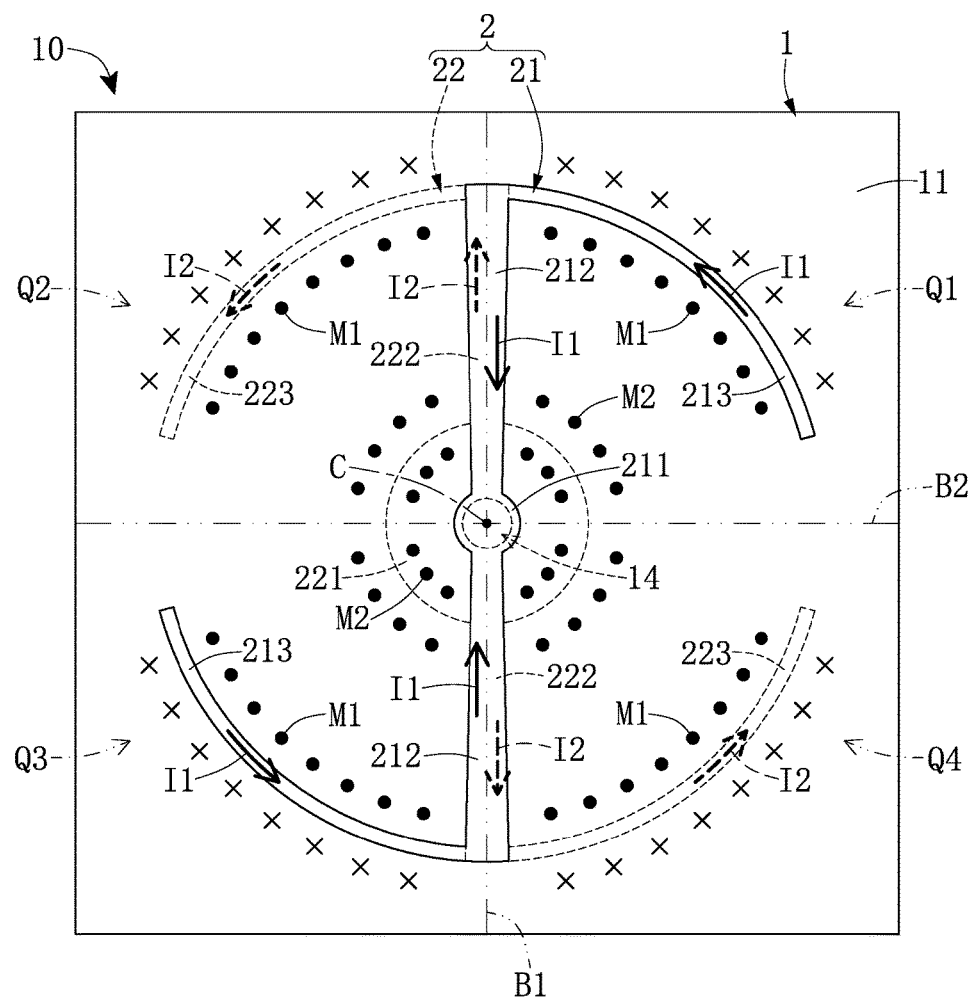
FIG. 4 is a planar view of FIG. 1.

As shown in FIG. 1, FIG. 3, and FIG. 4, the carrying plate 1 of the present embodiment is an insulating plate, and includes a connecting portion 13 substantially arranged on a center thereof. The carrying plate 1 defines a first boundary B1 and a second boundary B2 both orthogonal to each other at the connecting portion 13. The carrying plate 1 are defined as four quadrants by the first boundary B1 and the second boundary B2, and the four quadrants are named as a first quadrant Q1, a second quadrant Q2, a third quadrant Q3, and a fourth quadrant Q4 in sequence along a counterclockwise direction.

Specifically, the carrying plate 1 has a first surface 11 and a second surface 12 opposite to the first surface 11. The carrying plate 1 has a thru-hole 14 arranged on the connecting portion 13 and penetrating through the first surface 11 and the second surface 12. In other words, the thru-hole 14 corresponds in position to a point of intersection of the first boundary B1 and the second boundary B2.

As shown in FIG. 1 and FIG. 4, the antenna module 2 includes a feeding antenna 21 and a grounding antenna 22. The feeding antenna 21 is disposed on the first surface 11 of the carrying plate 1, and the grounding antenna 22 is disposed on the second surface 12 of the carrying plate 1. The feeding antenna 21 in the present embodiment does not contact the grounding antenna 22.

The feeding antenna 21 includes a feeding connecting segment 211, two feeding transmitting segments 212 connected to the feeding connecting segment 211, and two feeding radiating segments 213 respectively connected to the two feeding transmitting segments 212. The feeding connecting segment 211 is disposed on the connecting portion 13 of the carrying plate 1.

The two feeding transmitting segments 212 extend from the feeding connecting segment 211 along two opposite directions (e.g., an upward direction and a downward direction shown in FIG. 4) substantially parallel to the first boundary B1. In the present embodiment, the two feeding transmitting segments 212 are substantially arranged on the first boundary B1, and each of the two feeding transmitting segments 212 has a width that gradually increases along a direction away from the feeding connecting segment 211.

Moreover, the two feeding radiating segments 213 respectively and curvedly extend from the two feeding transmitting segments 212 toward the second boundary B2. The two feeding radiating segments 213 are respectively connected to ends of the two feeding transmitting segments 212 arranged away from the connecting portion 13 (e.g., ends of the two feeding transmitting segments 212 arranged away from each other shown in FIG. 4), and are respectively disposed in the first quadrant Q1 and the third quadrant Q3. In the present embodiment, each of the two feeding radiating segments 213 is substantially arc shaped and have the same radius, and a center of circle of each of the two feeding radiating segments 213 is substantially located at the feeding connecting segment 211, but the present disclosure is not limited thereto.

As shown in FIG. 1 and FIG. 4, the grounding antenna 22 includes a grounding connecting segment 221, two grounding transmitting segments 222 connected to the grounding connecting segment 221, and two grounding radiating segments 223 respectively connected to the two grounding transmitting segments 222. The grounding connecting segment 221 is disposed on the connecting portion 13 of the carrying plate 1, and is arranged around the thru-hole 14.

The two grounding transmitting segments 222 extend from the grounding connecting segment 221 along two opposite directions substantially parallel to the first boundary B1. In the present embodiment, the two grounding transmitting segments 222 are substantially arranged on the first boundary B1, and each of the two grounding transmitting segments 222 has a width that gradually increases along a direction away from the grounding connecting segment 221.

Moreover, the two grounding radiating segments 223 respectively and curvedly extend from the two grounding transmitting segments 222 toward the second boundary B2. The two grounding radiating segments 223 are respectively connected to ends of the two grounding transmitting segments 222 arranged away from the connecting portion 13 (e.g., ends of the two grounding transmitting segments 222 arranged away from each other shown in FIG. 1), and are respectively disposed in the second quadrant Q2 and the fourth quadrant Q4. In the present embodiment, each of the two grounding radiating segments 223 is substantially arc shaped and have the same radius, and a center of circle of each of the two grounding radiating segments 223 is substantially located at the grounding connecting segment 221, but the present disclosure is not limited thereto.

Specifically, as shown in FIG. 1 and FIG. 4, the two feeding transmitting segments 212 of the feeding antenna 21 respectively face the two grounding transmitting segments 222 of the grounding antenna 22, and the shape of the two feeding transmitting segments 212 is substantially identical to that of the two grounding transmitting segments 222. Moreover, the two feeding radiating segments 213 and the two grounding radiating segments 223 in the present embodiment each can be arc shaped and have the same radius, but the present disclosure is not limited thereto. Specifically, a center of circle of each of the two feeding radiating segments 213 and a center of circle of each of the two grounding radiating segments 223 are preferably located at (the connecting portion 13 or) an axis C that is orthogonal to the first boundary B1 and the second boundary B2.

Figure 5:
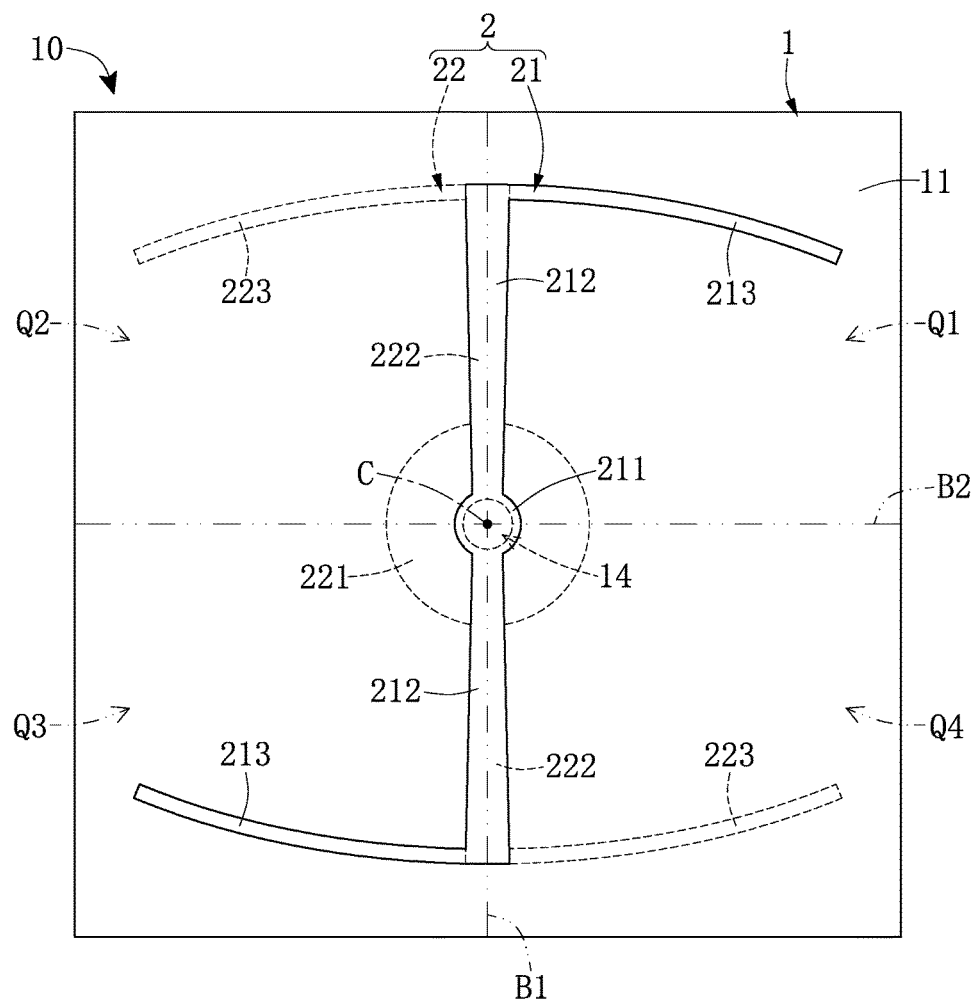
FIG. 5 is a planar view of the RFID reader according to the first embodiment of the present disclosure in another configuration as omitting the transmitting cable.

In addition, as shown in FIG. 5, the two feeding radiating segments 213 and the two grounding radiating segments 223 each can be in a curved shape. The feeding radiating segment 213 arranged in the first quadrant Q1 and the grounding radiating segment 223 arranged in the second quadrant Q2 are substantially in a mirror symmetrical arrangement with respect to the first boundary B1. The feeding radiating segment 213 arranged in the third quadrant Q3 and the grounding radiating segment 223 arranged in the fourth quadrant Q4 are substantially in a mirror symmetrical arrangement with respect to the first boundary B1. The feeding radiating segment 213 arranged in the first quadrant Q1 and the grounding radiating segment 223 arranged on the second quadrant Q2 are substantially mirror-symmetrical to the feeding radiating segment 213 arranged in the third quadrant Q3 and the grounding radiating segment 223 arranged in the fourth quadrant Q4 with respect to the second boundary B2.

In a top view of the carrying plate 1 and the antenna module 2, the feeding radiating segment 213 arranged in the first quadrant Q1 and the grounding radiating segment 223 arranged in the second quadrant Q2 have the same center of curvature, and the feeding radiating segment 213 arranged in the third quadrant Q3 and the grounding radiating segment 223 arranged in the fourth quadrant Q4 have the same center of curvature.

As shown in FIG. 1, FIG. 3, and FIG. 4, the transmitting cable 3 includes a feeding wire 31 and a grounding wire 32. The feeding wire 31 is connected to the feeding connecting segment 211, and the grounding wire 32 is connected to the grounding connecting segment 221. In the present embodiment, the feeding wire 31 is connected to the feeding connecting segment 211 by inserting into the thru-hole 14 of the carrying plate 1, but the present disclosure is not limited thereto. Moreover, two currents can respectively travel in the feeding wire 31 and the grounding wire 32 of the transmitting cable 3 along two opposite directions. In other words, when a current travels into the feeding wire 31, the other current travels out of the grounding wire 32.

Specifically, when a first current I1 related to the feeding wire 31 travels in the two feeding radiating segments 213, and a second current I2 related to the grounding wire 32 travels in the two grounding radiating segments 223, the two feeding radiating segments 213 and the two grounding radiating segments 223 each generate a first magnetic direction M1, and are arranged in an annular shape to co-generate a second magnetic direction M2. The first magnetic directions M1 and the second magnetic direction M2 face the same side of the carrying plate 1 (e.g., an upper side of the carrying plate 1 shown in FIG. 1).

It should be noted that the first magnetic directions M1 and the second magnetic direction M2 of the present embodiment can be judged according to the right-hand grip rule. Specifically, a thumb presents a direction of the current I1, I2 traveling in any one of the radiating segments 213, 223, and the other four fingers present the corresponding first magnetic direction M1. Moreover, four fingers other than the thumb present a direction of the currents I1, I2 traveling in the radiating segments 213, 223, and the thumb presents the second magnetic direction M2. FIG. 4 of the present embodiment approximately shows the distribution of the first magnetic directions M1 and the second magnetic direction M2, but the present disclosure is not limited thereto.

Accordingly, the RFID reader is provided with the two feeding radiating segments 213 and the two grounding radiating segments 223 for jointly generating the second magnetic direction M2 to enhance a region that cannot be covered by the first magnetic directions M1, so that the near field reading performance of the RFID reader can be improved. In other words, the RFID reader can generate a plurality of magnetic fields each having a magnetic direction perpendicular to the carrying plate 1, so that the RFID reader have a better near field reading performance for information carriers disposed on the carrying plate 1.

In addition, since the two feeding transmitting segments 212 and the two grounding transmitting segments 222 face with each other and have a substantially identical shape, a magnetic field generated from the first current I1 that travels in the two feeding transmitting segments 212 eliminates a magnetic field generated from the second current I2 that travels in the two grounding transmitting segments 222 for preventing the near field reading performance of the RFID from being affected.

Second Embodiment

Figure 6:
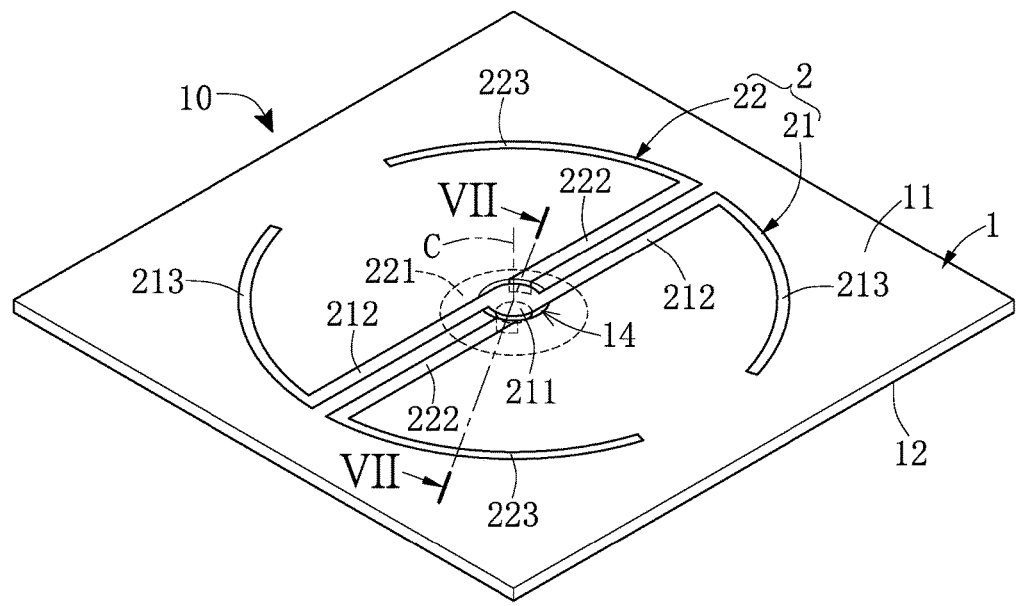
FIG. 6 is a perspective view of the RFID reader according to a second embodiment of the present disclosure as omitting the transmitting cable.
Figure 7:
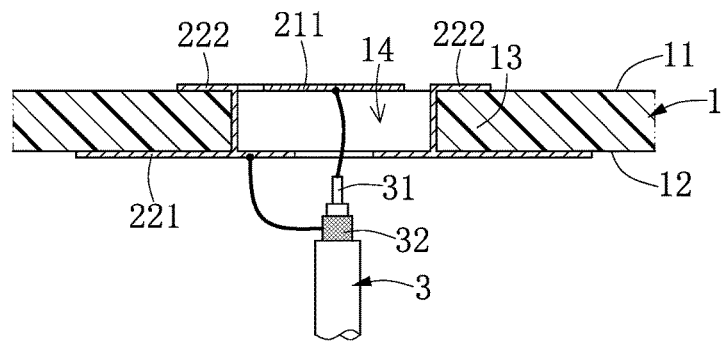
FIG. 7 is a cross-sectional view taken along a cross-sectional line V II-V II of FIG. 6.

Referring to FIG. 6 and FIG. 7, a second embodiment of the present disclosure provides an RFID reader. The present embodiment is similar to the first embodiment, and the difference between the embodiments resides in the following description.

In the present embodiment, the feeding connecting segment 211 and the grounding connecting segment 221 are respectively disposed on the first surface 11 and the second surface 12 of the carrying plate 1. Moreover, the two feeding transmitting segments 212, the two feeding radiating segments 213, the two grounding transmitting segments 222, and the two grounding radiating segments 223 are disposed on one of the first surface 11 (as shown in FIG. 6) and the second surface 12 (not shown).

In addition, if the grounding antenna 22 (or the feeding antenna 21) has a first portion disposed on the first surface 11 and a second portion disposed on the second surface 12, the grounding antenna 22 (or the feeding antenna 21) can be provided with a conductor (not labeled) arranged in the thru-hole 14 to connect the first and second portions. Moreover, the conductor arranged in the carrying plate 1 can be regarded as a part of the grounding antenna 22 (or the feeding antenna 21).

Third Embodiment

Figure 8:
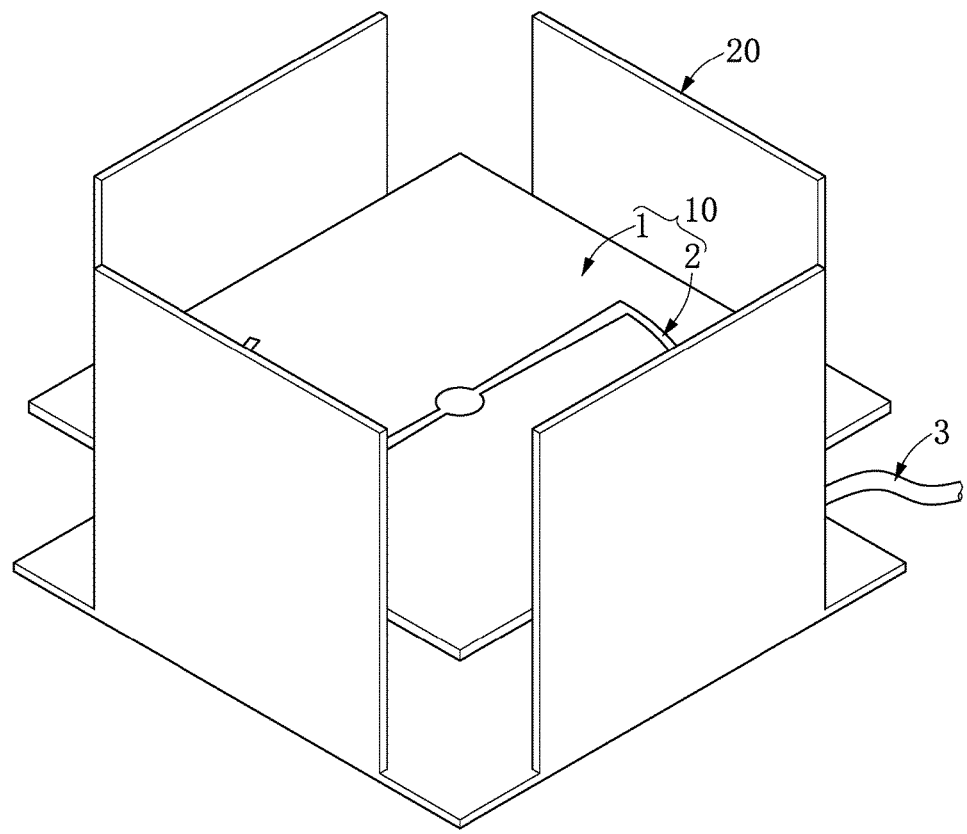
FIG. 8 is a perspective view of the RFID reader according to a third embodiment of the present disclosure.

Referring to FIG. 8, a third embodiment of the present disclosure provides an RFID reader. The present embodiment is similar to the first and second embodiments, and the difference between the embodiments resides in the following description.

In the present embodiment, the RFID further includes a reflecting box 20, and the carrying plate 1 and the antenna module 2 are arranged in the reflecting box 20, so that magnetic fields generated from the antenna module 2 can be reflected toward the same direction by the reflecting box 20. In other words, the magnetic fields generated from the antenna module 2 can be reflected by the reflecting box 20 toward one side (e.g., the upper side of the carrying plate 1 shown in FIG. 8) that is substantially the same side of the first magnetic directions M1 and the second magnetic direction M2. The RFID reader can include a plurality of posts (not shown) arranged between the carrying plate 1 and a bottom of the reflecting box 20, thereby adjusting or maintaining the position of the carrying plate 1 with respect to the reflecting box 20.

Moreover, the reflecting box 20 can shield outer noise thereby preventing the RFID reader from having a misreading drawback.

Fourth Embodiment

Figure 9:
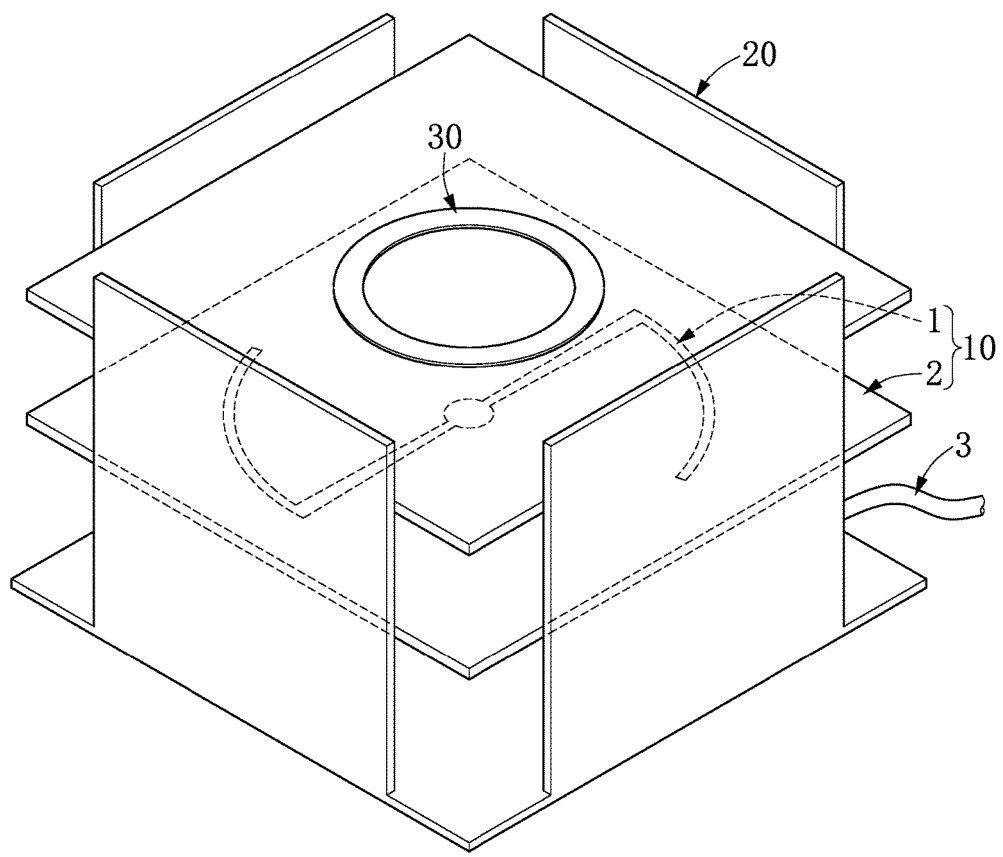
FIG. 9 is a perspective view of the RFID reader according to a fourth embodiment of the present disclosure.

Referring to FIG. 9, a fourth embodiment of the present disclosure provides an RFID reader. The present embodiment is similar to the third embodiment, and the difference between the embodiments resides in the following description.

In the present embodiment, the RFID reader further includes a guiding ring 30 arranged in the reflecting box 20, and the carrying plate 1 and the antenna module 2 are arranged inside a space defined by the reflecting box 20 and the guiding ring 30. Accordingly, magnetic fields generated from the antenna module 2 can be guided toward the same direction by the guiding ring 30. In other words, the magnetic fields generated from the antenna module 2 can be guided by the guiding ring 30 toward one side (e.g., the upper side of the carrying plate 1 shown in FIG. 9) that is substantially the same side of the first magnetic directions M1 and the second magnetic direction M2.

The guiding ring 30 in the present embodiment is formed on a board (not shown, such as a FR4 board), and posts (not shown) disposed between the board and the carrying plate 1, so that the guiding ring 30 is arranged in the reflecting box 20. Moreover, the related position between the guiding ring 30 and the reflecting box 20 can be implemented by other manners or structures.

In conclusion, the RFID reader of the present disclosure can have a better near field reading performance by the antenna structure 10 thereof. The two feeding radiating segments 213 and the two grounding radiating segments 223 of the antenna structure 10 each can generate a first magnetic direction M1, and are arranged in an annular shape to co-generate a second magnetic direction M2, in which the first magnetic directions M1 and the second magnetic direction M2 face the same side of the carrying plate 1.

Specifically, the RFID reader of the present disclosure is provided with the two feeding radiating segments 213 and the two grounding radiating segments 223 for jointly generating the second magnetic direction M2 to enhance a region that cannot be covered by the first magnetic directions M1, so that the near field reading performance of the RFID reader can be improved. Moreover, the RFID reader can generate a plurality of magnetic fields each having a magnetic direction perpendicular to the carrying plate 1, so that the RFID reader have a better near field reading performance for information carriers disposed on the carrying plate 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A radio-frequency identification (RFID) reader, comprising:
   a carrying plate having a connecting portion and defining a first boundary and a second boundary both orthogonal to each other at the connecting portion, wherein the carrying plate is defined as four quadrants by the first boundary and the second boundary, and the four quadrants are named as a first quadrant, a second quadrant, a third quadrant, and a fourth quadrant in sequence along a counterclockwise direction;

an antenna module disposed on the carrying plate and including:
- a feeding antenna including:
  - a feeding connecting segment disposed on the connecting portion;
  - two feeding transmitting segments extending from the feeding connecting segment along two opposite directions substantially parallel to the first boundary; and
  - two feeding radiating segments respectively and curvedly extending from the two feeding transmitting segments toward the second boundary, wherein the two feeding radiating segments are respectively connected to ends of the two feeding transmitting segments arranged away from the connecting portion, and are respectively disposed in the first quadrant and the third quadrant; and
- a grounding antenna including:
  - a grounding connecting segment disposed on the connecting portion;
  - two grounding transmitting segments extending from the grounding connecting segment along two opposite directions substantially parallel to the first boundary; and
  - two grounding radiating segments respectively and curvedly extending from the two grounding transmitting segments toward the second boundary, wherein the two grounding radiating segments are respectively connected to ends of the two grounding transmitting segments arranged away from the connecting portion, and are respectively disposed in the second quadrant and the fourth quadrant; and a transmitting cable including a feeding wire and a grounding wire, wherein the feeding wire is connected to the feeding connecting segment, and the grounding wire is connected to the grounding connecting segment;

when a first current related to the feeding wire travels in the two feeding radiating segments, and a second current related to the grounding wire travels in the two grounding radiating segments, the two feeding radiating segments and the two grounding radiating segments each generate a first magnetic direction, and are arranged in an annular shape to co-generate a second magnetic direction; the first magnetic directions and the second magnetic direction face the same side of the carrying plate.

2. The RFID reader according to claim 1, wherein each of the two feeding radiating segments and the two grounding radiating segments is arc shaped; the feeding radiating segment arranged in the first quadrant and the grounding radiating segment arranged in the second quadrant are substantially in a mirror symmetrical arrangement with respect to the first boundary; the feeding radiating segment arranged in the third quadrant and the grounding radiating segment arranged in the fourth quadrant are substantially in a mirror symmetrical arrangement with respect to the first boundary; the feeding radiating segment arranged in the first quadrant and the grounding radiating segment arranged in the second quadrant are substantially mirror-symmetrical to the feeding radiating segment arranged in the third quadrant and the grounding radiating segment arranged in the fourth quadrant with respect to the second boundary.

3. The RFID reader according to claim 1, wherein each of the two feeding radiating segments and the two grounding radiating segments is arc shaped and have the same radius, and a center of circle of each of the two feeding radiating segments and a center of circle of each of the two grounding radiating segments is located at an axis that is orthogonal to the first boundary and the second boundary.

4. The RFID reader according to claim 1, wherein the carrying plate has a first surface and a second surface opposite to the first surface, the feeding antenna is disposed on the first surface, the grounding antenna is disposed on the second surface, and the two feeding transmitting segments respectively face the two grounding transmitting segments.

5. The RFID reader according to claim 1, wherein the carrying plate has a first surface and a second surface opposite to the first surface, the feeding connecting segment and the grounding connecting segment are respectively disposed on the first surface and the second surface, and the two feeding transmitting segments, the two feeding radiating segments, the two grounding transmitting segments, and the two grounding radiating segments are disposed on one of the first surface and the second surface.

6. The RFID reader according to claim 1, further comprising a reflecting box, wherein the carrying plate and the antenna module are arranged in the reflecting box.

7. The RFID reader according to claim 6, further comprising a guiding ring arranged in the reflecting box, wherein the carrying plate and the antenna module are arranged in a space defined by the reflecting box and the guiding ring.

8. An antenna structure of an RFID reader, comprising:
a carrying plate having a connecting portion and defining a first boundary and a second boundary both orthogonal to each other at the connecting portion, wherein the carrying plate is defined as four quadrants by the first boundary and the second boundary, and the four quadrants are named as a first quadrant, a second quadrant, a third quadrant, and a fourth quadrant in sequence along a counterclockwise direction;

an antenna module disposed on the carrying plate and including:
- a feeding antenna including:
  - a feeding connecting segment disposed on the connecting portion;
  - two feeding transmitting segments extending from the feeding connecting segment along two opposite directions substantially parallel to the first boundary; and
  - two feeding radiating segments respectively and curvedly extending from the two feeding transmitting segments toward the second boundary, wherein the two feeding radiating segments are respectively connected to ends of the two feeding transmitting segments arranged away from the connecting portion, and are respectively disposed in the first quadrant and the third quadrant; and
- a grounding antenna including:
  - a grounding connecting segment disposed on the connecting portion;
  - two grounding transmitting segments extending from the grounding connecting segment along two opposite directions substantially parallel to the first boundary; and
  - two grounding radiating segments respectively and curvedly extending from the two grounding transmitting segments toward the second boundary, wherein the two grounding radiating segments are respectively connected to ends of the two grounding transmitting segments arranged away from the connecting portion, and are respectively disposed in the second quadrant and the fourth quadrant.

9. The antenna structure according to claim 8, wherein each of the two feeding radiating segments and the two grounding radiating segments is arc shaped; the feeding radiating segment arranged in the first quadrant and the grounding radiating segment arranged in the second quadrant are substantially in a mirror symmetrical arrangement with respect to the first boundary; the feeding radiating segment arranged in the third quadrant and the grounding radiating segment arranged in the fourth quadrant are substantially in a mirror symmetrical arrangement with respect to the first boundary; the feeding radiating segment arranged in the first quadrant and the grounding radiating segment arranged in the second quadrant are substantially mirror-symmetrical to the feeding radiating segment arranged in the third quadrant and the grounding radiating segment arranged in the fourth quadrant with respect to the second boundary.

10. The antenna structure according to claim 8, wherein each of the two feeding radiating segments and the two grounding radiating segments is arc shaped and have the same radius, and a center of circle of each of the two feeding radiating segments and a center of circle of each of the two grounding radiating segments are located at an axis that is orthogonal to the first boundary and the second boundary.

* * * * *